United States Patent
Le et al.

(10) Patent No.: US 7,445,827 B2
(45) Date of Patent: Nov. 4, 2008

(54) POLYMER COMPOSITIONS FOR REDUCED SHRINKAGE

(75) Inventors: Dang Le, Houston, TX (US); Jerome Thierry-Mieg, Houston, TX (US); Doug Burmaster, Houston, TX (US); Frank Li, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 85 days.

(21) Appl. No.: 11/292,525

(22) Filed: Dec. 2, 2005

(65) Prior Publication Data

US 2007/0128388 A1 Jun. 7, 2007

(51) Int. Cl.
*B29D 23/00* (2006.01)

(52) U.S. Cl. .................. 428/35.7; 264/513; 524/528; 524/578; 524/582; 524/584

(58) Field of Classification Search ................ 524/528, 524/578, 582, 584; 264/513; 428/35.7
See application file for complete search history.

(56) References Cited

U.S. PATENT DOCUMENTS

| | | | |
|---|---|---|---|
| 4,107,413 A | 8/1978 | Giannini et al. | |
| 4,114,319 A | 9/1978 | Governale | |
| 4,220,554 A | 9/1980 | Scata et al. | |
| 4,294,721 A | 10/1981 | Cecchin et al. | |
| 4,439,540 A | 3/1984 | Cecchin et al. | |
| 4,460,701 A | 7/1984 | Terano et al. | |
| 4,562,173 A | 12/1985 | Terano et al. | |
| 4,742,106 A * | 5/1988 | Kamiya et al. | 524/449 |
| 5,066,738 A | 11/1991 | Ewen | |
| 5,530,055 A * | 6/1996 | Needham | 524/528 |
| 5,891,946 A * | 4/1999 | Nohara et al. | 524/427 |
| 5,985,971 A * | 11/1999 | Srinivasan et al. | 524/425 |
| 6,503,990 B2 | 1/2003 | Kasehagen et al. | |
| 6,683,125 B1 * | 1/2004 | Augestad et al. | 524/490 |
| 2002/0077396 A1 * | 6/2002 | Yu et al. | 524/232 |
| 2003/0176580 A1 * | 9/2003 | Seelert et al. | 525/240 |
| 2005/0107558 A1 | 5/2005 | Poncelet et al. | |

OTHER PUBLICATIONS

"Impact Copolymer," Polypropylene EOD04-40 Developmental, Total Petrochemicals USA, Inc., 1 pg.
"Crodamide EBS," Croda Universal, Inc., 2 pgs.
"DHT-4A (Hydrotalcite-like compound)," Kyowa Chemical Industry Co., Ltd., 2 pgs.
"Random Copolymer—Blow Molding Grade for Medical Applications," Polypropylene 6232, Total Petrochemicals USA, Inc., 1 pg.
"NICRON® 554," Luzenac America, Inc., 2 pgs.
"Clarified Random Copolymer for Injection Molding," Polypropylene 6823MZ, Total Petrochemicals USA, Inc., 1 pg.
"Nucleated Random Copolymer for Injection Molding," Polypropylene 6825WZ, Total Petrochemicals USA, Inc., 1 pg.
"Clarified Random Copolymer for Injection Molding," Polypropylene 6843MZ, Total Petrochemicals USA, Inc., 1 pg.
"Impact Copolymer," Polypropylene 4920WZ, Total Petrochemicals USA, Inc., 1 pg.
"Homopolymer—Injection Molding," Polypropylene 3620WZ, Total Petrochemicals USA, Inc., 1 pg.
"BT-2203," Material Safety Data Sheet, IMI FABI, LLC, Jul. 1, 2001, 3 pgs.
"PATIONIC® 901RF," Material Safety Data Sheet, American Ingredients Company, 2 pgs.
"Sodium Benzoate," Material Safety Data Sheet, Mallinckrodt, Inc., Sep. 12, 1985, 5 pgs.
"Calcium Stearate," Material Safety Data Sheet, Mallinckrodt, Inc., Jan. 21, 2003, 7 pgs.

* cited by examiner

*Primary Examiner*—Bernard Lipman
(74) *Attorney, Agent, or Firm*—Diane L. Kilpatrick-Lee (57) ABSTRACT

A polymeric composition comprising a polymer and a nucleation agent, and having isotropic shrinkage of less than about 20% and a differential shrinkage of less than about 20%.

21 Claims, 4 Drawing Sheets

POLYMER COMPOSITIONS FOR REDUCED SHRINKAGE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

This invention relates to polymeric compositions. More specifically, this invention relates to polymeric compositions for high speed manufacturing of thin wall packaging containers.

2. Background of the Invention

Polypropylene materials, formed by catalysts such as Ziegler-Natta or metallocene compounds, are among the most versatile and commonly used thermoplastics in the world today. These materials are formed into a variety of end-use articles ranging from automobile parts to food containers using a number of plastics shaping processes. One such process is injection molding.

In injection molding, a plastic component is formed from molten polymer resin that is injected into a mold cavity. The molten resin is held in the cavity for a sufficient time period to allow the part component to form. The time required for the molding to cool and be removed, or the cooling phase, is an important factor in the production time and therefore in the manufacturing efficiency. Resin properties such as thermal expansion and compressibility determine the extent to which a molten resin will undergo dimensional changes during the cooling phase. These dimensional changes that occur during the cooling phase are termed shrinkage.

During the manufacturing of plastic components, shrinkage results in a volume difference between the initially cast mold and the final molded article. If the dimensional changes are uniform the shrinkage is termed isotropic while varying dimensional changes are termed anisotropic or differential. The shrinkage whether isotropic or anisotropic must be accurately accounted for in the manufacturing of plastic components in order to obtain end-use articles of the correct dimensions.

Given the foregoing discussion, it would be desirable to develop a method of manufacturing end-use articles from a polymeric resin having a reduced amount of shrinkage with a short cooling phase. It would also be desirable for this polymeric resin to display enhanced mechanical properties such as impact strength and stiffness.

BRIEF SUMMARY OF SOME OF THE PREFERRED EMBODIMENTS

Disclosed herein is a polymeric composition comprising a polymer and a nucleation agent, and having isotropic shrinkage of less than about 20% and a differential shrinkage of less than about 20%.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

DETAILED DESCRIPTION OF THE PREFERRED EMBODIMENTS

A polymeric composition is prepared comprising a polymer resin and a modifier. In an embodiment, the polymer resin comprises a polypropylene copolymer such as an impact copolymer. Polypropylene impact copolymers (PPics) are bi-phasic polymers wherein a polypropylene homopolymer phase or component is joined to a copolymer phase or component. The PPic may comprise from greater than about 6.5% to less than about 11.5% by weight ethylene, alternatively about 8.5% to less than about 10.5%, alternatively about 9.5% ethylene based on the total weight of the PPic. Herein, percentages of a component refer to the percent by weight of that component in the total composition unless otherwise noted.

The homopolymer phase of an PPic may be a propylene homopolymer, provided however that the homopolymer phase may contain up to about 5% of another alpha-olefin, including but not limited to $C_2$-$C_8$ alpha-olefins such as ethylene and 1-butene. Despite the potential presence of small amounts of other alpha-olefins, this component of the PPic is generally referred to as a polypropylene homopolymer.

The copolymer phase of a PPic may be a random copolymer of propylene and ethylene, also referred to as an ethylene/propylene rubber (EPR). Without wishing to be limited by theory, the EPR portion of the PPic has rubbery characteristics which, when incorporated within the matrix of the homopolymer component, may function to provide increased impact strength to the PPic. In an embodiment, the EPR portion of the PPic comprises greater than about 14 wt. % of the PPic, alternatively greater than about 18 wt. % of the PPic, alternatively from about 14 wt. % to about 18 wt. % of the PPic.

The amount of ethylene present in the EPR portion of the PPic may be from about 38% to about 50%, alternatively from about 40% to about 45% based on the total weight of the EPR portion. The amount of ethylene present in the EPR portion of the PPic may be determined spectrophotometrically using a fourier transform infrared spectroscopy (FTIR) method. Specifically, the FTIR spectrum of a polymeric sample is recorded for a series of samples having a known EPR ethylene content. The ratio of transmittance at $720 \text{ cm}^{-1}/900 \text{ cm}^{-1}$ is calculated for each ethylene concentration and a calibration curve may then be constructed. Linear regression analysis on the calibration curve can then be carried out to derive an equation that is then used to determine the EPR ethylene content for a sample material.

The EPR portion of the PPic may exhibit an intrinsic viscosity different from that of the propylene homopolymer component. Herein intrinsic viscosity refers to the capability of a polymer in solution to increase the viscosity of said solution. Viscosity is defined herein as the resistance to flow due to internal friction. In an embodiment, the intrinsic viscosity of the EPR portion of the PPic may be greater than about 2.0 dl/g, alternatively from about 2.0 dl/g to about 3.0 dl/g, alternatively from about 2.4 dl/g to about 3.0 dl/g, alternatively from about 2.4 dl/g to about 2.7 dl/g, alternatively from about 2.6 dl/g to about 2.8 dl/g. The intrinsic viscosity of the EPR portion of the PPic is determined in accordance with ASTM D-5225.

In an embodiment, the PPic may have a melt flow rate (MFR) of from about 65 g/10 min. to about 130 g/10 min., alternatively from about 70 g/10 min. to about 120 g/10 min., alternatively from about 70 g/10 min. to about 100 g/10 min., alternatively from about 70 g/10 min. to about 90 g/10 min., alternatively from about 75 g/10 min. to about 85 g/10 min., alternatively about 90 g/10 min. Excellent flow properties as indicated by a high MFR allow for high throughput manufacturing of molded polymeric components. In an embodiment, the PPic is a reactor grade resin without modification, which may also be termed a low order PP. In some embodiments, the PPic is a controlled rheology grade resin, wherein the melt flow rate has been adjusted by various techniques such as visbreaking. For example, MFR may be increased by visbreaking as described in U.S. Pat. No. 6,503,990, which is incorporated by reference in its entirety. As described in that publication, quantities of peroxide are mixed with polymer resin in flake, powder, or pellet to increase the MFR of the resin. MFR as defined herein refers to the quantity of a melted polymer resin that will flow through an orifice at a specified temperature and under a specified load. The MFR may be determined using a dead-weight piston Plastometer that extrudes polypropylene through an orifice of specified dimensions at a temperature of 230° C. and a load of 2.16 kg in accordance with ASTM Standard Test Method D-1238.

Representative examples of suitable PPics include without limitation TOTAL POLYPROPYLENE 4920W and TOTAL POLYPROPYLENE 4920WZ are impact copolymer resins available from Total Petrochemicals USA Inc. In an embodiment, the PPic (e.g., TOTAL POLYPROPYLENE 4920W) has about the physical properties set forth in Table 1.

TABLE 1

|  | Typical Value | ASTM Method |
|---|---|---|
| Resin Properties |  |  |
| Melt Flow, g/10 min. | 100 | D-1238 |
| Density, g/cc | 0.905 | D-1505 |
| Melting Point, ° C. | 160-165 | TOTAL METHOD |
| Mechanical Properties |  |  |
| Tensile strength at Yield, psi (MPa) | 3700 (25) | D-638 |
| Elongation at Yield, % | 6 | D-638 |
| Flexural Modulus, psi (MPa) | 190,000 (1,300) | D-790 |
| Izod Impact @ 73° F. Notched-ft · lb./in. (J/m) | 1.0 (50) | D-256A |
| Thermal Properties |  |  |
| Heat Deflection, ° C. | 90 | D-648 |

PPics may be formed by a sequential polymerization process. The polymerization reaction may be carried out in a two-reactor configuration in which the catalyst, typically a Ziegler-Natta catalyst and propylene are charged into a first loop reactor equipped with a circulation pump. Within the reactor, the propylene homopolymer is produced on the surface of the catalyst particles. The propylene polymer-coated catalyst grains are then transferred to one or more secondary gas-phase reactors with a fluidized bed where the copolymer is produced by the copolymerization of the propylene and the ethylene in the presence of a catalyst, again typically a Ziegler-Natta catalyst.

Standard equipment and procedures for polymerizing propylene and another alpha olefin such as ethylene into an impact copolymer are known to one skilled in the art. Examples of catalysts suitable for the preparation of PPics are disclosed in U.S. Pat. Nos. 4,107,413; 4,294,721; 4,439,540; 4,114,319; 4,220,554; 4,460,701; 4,562,173; and 5,066,738, each of which are incorporated by reference herein.

In an alternative embodiment, the polymer resin is a polypropylene homopolymer provided however that the homopolymer may contain up to about 5% of another alpha-olefin, including but not limited to $C_2$-$C_8$ alpha-olefins such as ethylene and 1-butene. Despite the potential presence of small amounts of other alpha-olefins, this is generally referred to as a polypropylene homopolymer.

Such polypropylene homopolymers and methods for preparing same are known to one of ordinary skill in the art. Without limitation, a representative example of a suitable polypropylene homopolymer includes TOTAL POLYPROPYLENE 3620WZ available from Total Petrochemicals Inc. A suitable polypropylene homopolymer (e.g., TOTAL POLYPROPYLENE 3620WZ) has about the physical properties given in Table 2.

TABLE 2

|  | Typical Value | ASTM Method |
|---|---|---|
| Resin Properties |  |  |
| Melt Flow, g/10 min. | 12 | D-1238 |
| Density, g/cc | 0.905 | D-1505 |
| Melting Point, ° C. | 165 | TOTAL METHOD |
| Mechanical Properties |  |  |
| Tensile strength at Yield, psi (MPa) | 5400 (37.2) | D-638 |
| Elongation at Yield, % | 12 | D-638 |
| Flexural Modulus, psi (MPa) | 230,000 (1,725) | D-790 |
| Izod Impact @ 73° F. Notched-ft · lb./in. (J/m) | 0.5 (26.7) | D-256A |
| Thermal Properties |  |  |
| Heat Deflection, ° C. | 127 | D-648 |

As noted previously, the polymeric composition may comprise one or more modifiers for the polymer resin (e.g., PPic). Suitable modifiers include nucleators, mold release agents, antistatic agents, acid neutralizers, additives, and combinations thereof.

In an embodiment, the modifier comprises a nucleator. A nucleator may function to enhance the optical properties of the resin, improve the resin's processing productivity by speeding cycles, and also may enhance mechanical properties such as stiffness and heat resistance. Herein nucleators refer to compounds that increase the rate of crystallization of the polymer. During crystallization of a polymer such as polypropylene, the crystals formed are typically larger than the wavelength of light. Crystals of this size refract light and thus can reduce the clarity of the copolymer. Without wishing to be limited by theory, a nucleator may provide a heterogeneous surface that acts as a crystallization site and increases the rate of polymer crystallization. In the presence of a nucleator, crystals may form at higher temperatures and the higher rate of crystal formation induces formation of smaller crystals such as spherulites. The smaller crystal size allows light to pass with reduced refraction, thereby increasing the clarity of the polymer. In an embodiment, any nucleator chemically compatible with the polymer resin, e.g., a PPic such as $C_2/C_3$ impact copolymer, and that is able to reduce the isotropic and/or differential shrinkage thereof may be included in the composition in amounts effective to impart the desired physical properties.

In an embodiment, the nucleator is an aromatic carboxylic acid salt, alternatively a metal benzoate, alternatively sodium benzoate, alternatively lithium benzoate. Alternatively, the nucleator may be an organophosphate, alternatively, a pine rosin. Alternatively, the nucleator is a sorbitol compound or derivative of sorbitol, alternatively dibenzylidene sorbitol. Alternatively, the nucleator is a norbornane carboxylic acid salt.

Without wishing to be limited by theory, a suitable nucleator can be classified according to its ability to cause uniform nucleation across the polymeric solution. In an embodiment, the nucleator is talc and is present in amounts ranging iteratively from about 1000 ppm to about 10,000 ppm, alternatively from about 1000 ppm to about 5,000 ppm, alternatively from about 1000 ppm to about 4000 ppm.

In an embodiment, the modifier comprises a mold release agent and an antistatic agent. The mold release agent and antistatic agent may be a combination of a metallic sterate and a glycerol ester, respectively. In an embodiment, the mold release agent and antistatic agent may be used in combination or individually. In some embodiments, the mold release agent and antistatic agent are the same compound.

An example of a suitable glycerol ester includes without limitation glycerol monosterate (GMS) present in amounts ranging iteratively from about 500 ppm to about 5000 ppm, alternatively from about 750 ppm to about 3000 ppm, alternatively from about 1000 ppm to about 2000 ppm, alternatively from about 1000 ppm to about 1500 ppm, alternatively about 1250 ppm. Without wishing to be limited by theory, an antistatic agent, e.g. GMS, may function by migrating to the surface of the polymeric material and creating a film with water that dissipates the static electricity present at the surface of the material. Antistatic agents present in the disclosed amounts may be effective at reducing the static electricity without negatively impacting the adhesion of additional components or materials such as colorants to the end-use articles prepared from the disclosed polymeric composition.

An example of suitable mold release agent is a metallic sterate such as zinc sterate present in amounts ranging iteratively from about 500 ppm to about 5000 ppm, alternatively from about 500 ppm to about 3000 ppm, alternatively from about 750 ppm to about 2000 ppm, alternatively from about 750 ppm to about 1500 ppm, alternatively about 1000 ppm. Alternatively, the mold release agent is N, N' distearoylethylenediamine present in amounts ranging iteratively from about 250 ppm to about 2500 ppm, alternatively from about 500 ppm to about 2000 ppm, alternatively from about 750 ppm to about 1500 ppm, alternatively about 1000 ppm. Without wishing to be limited by theory, a mold release agent is used to reduce the extent of adhesion of the final molded part to the mold cavity. A mold release agent may be used to reduce the extent of adhesion of the final molded part to the mold cavity.

In an embodiment, the modifier comprises an acid neutralizer. In some embodiments, the acid neutralizer is hydrotalcite present in amounts ranging iteratively from about 100 ppm to about 1000 ppm, alternatively from about 150 ppm to about 400 ppm, alternatively about 300 ppm. In some embodiments, the mold release agent and acid neutralizer comprise a single compound. An example of a suitable combined mold release and acid neutralization agent includes, without limitation, calcium sterate present in amounts ranging iteratively from about 200 ppm to about 2000 ppm, alternatively from about 200 ppm to about 1500 ppm, alternatively from about 350 ppm to about 1000 ppm, alternatively from about 350 ppm to about 750 ppm, alternatively about 500 ppm. The acid neutralizer may function to remove residue remaining in the polymer resin from the polymerization catalyst and to prevent corrosion of the mold cavity.

In an embodiment, the polymeric composition may also contain additives as deemed necessary to impart the desired physical properties. Examples of additives include without limitation stabilizers, ultra-violet screening agents, oxidants, anti-oxidants such as phenolics and phosphamides, ultraviolet light absorbents, fire retardants, processing oils, coloring agents, pigments/dyes, fillers, and/or the like with other components. The aforementioned additives may be used either singularly or in combination to form various formulations of the polymer. For example, stabilizers or stabilization agents may be employed to help protect the polymer resin from degradation due to exposure to excessive temperatures and/or ultraviolet light. These additives may be included in amounts effective to impart the desired properties. Effective additive amounts and processes for inclusion of these additives to polymeric compositions are known to one skilled in the art.

The polymeric composition may display enhanced mechanical properties such as increased impact strength as reflected in an increased Izod Impact strength and/or increased stiffness as reflected in an increased flexural modulus. Izod impact is defined as the kinetic energy needed to initiate a fracture in a specimen and continue the fracture until the specimen is broken. Tests of the Izod impact strength determine the resistance of a polymer sample to breakage by flexural shock as indicated by the energy expended from a pendulum type hammer in breaking a standard specimen in a single blow. The specimen is notched which serves to concentrate the stress and promotes a brittle rather than ductile fracture. Specifically, the Izod Impact test measures the amount of energy lost by the pendulum during the breakage of the test specimen. The energy lost by the pendulum is the sum of the energies required to initiate sample fracture, to propagate the fracture across the specimen, and any other energy loss associated with the measurement system (e.g., friction in the pendulum bearing, pendulum arm vibration, sample toss energy). In an embodiment, the polymeric composition of this disclosure may have an Izod impact strength of equal to or greater than about 0.7 ft. lb/inch, alternatively equal to or greater than about 1.0 ft. lb/inch, alternatively equal to or greater than about 1.3 ft. lb/inch, alternatively equal to or greater than about 1.5 ft. lb/inch, alternatively from about 0.7 to about 1.6 ft. lb/inch, alternatively from about 1.5 to about 1.6 ft. lb/inch as determined in accordance with ASTM D-256.

The polymeric composition may also display an improved stiffness as determined by an increase in the flexural modulus. The flexural modulus test in broad terms measures the force required to bend a sample material beam. The force is applied to the center of the sample beam, while the beam is supported on both ends. In an embodiment, the polymeric composition has a flexural modulus of from about 160,000 psi to about 220,000 psi, alternatively from about 160,000 psi to about 180,000 psi, alternatively from about 165,000 psi to about 185,000 psi, as measured according to ASTM D790 or ISO 178.

In an embodiment, the polymeric composition described herein and end-use articles formed there from exhibit isotropic shrinkage of less than about 20%, alternatively less than about 10%, alternatively less than about 1%. In an embodiment, the polymeric composition described herein and end-use articles formed there from exhibit differential or anisotropic shrinkage of less than about 20%, alternatively less than about 10%, alternatively less than about 5%. Herein isotropic shrinkage refers to uniform shrinkage in all directions and results in an end-use article that is smaller than intended. Herein anisotropic shrinkage, also termed differential shrinkage, refers to shrinkage that is not uniform in each direction and results in warpage of an end-use article. Warpage as defined herein refers to a distortion where the surfaces of the end-use article do not follow the intended shape of the design.

Shrinkage may be calculated by first measuring the length of contraction upon cooling in the in-flow direction (termed longitudinal direction when measuring differential shrinkage) and the length of contraction occurring in the cross-flow direction (termed transverse direction when measuring differential shrinkage). The difference in the in-flow and cross-flow contractions multiplied by 100% gives the percent shrinkage. Typical measurements of shrinkage are limited to measuring the changes in the direction of resin flow and in a direction perpendicular to the direction of resin flow.

Figure 1:
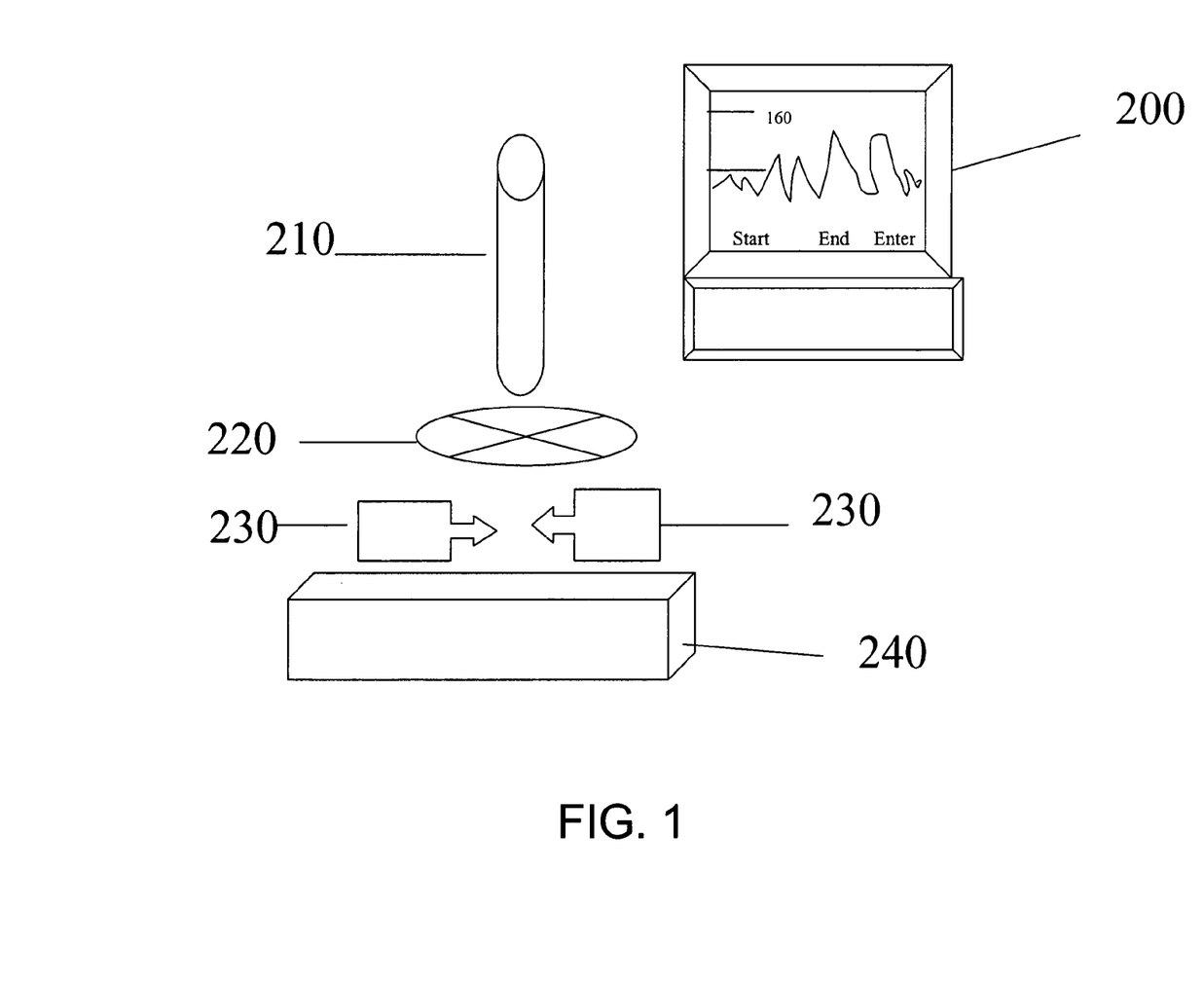
FIG. 1 is a schematic of an optical device.

In an embodiment, the shrinkage of a polymeric specimen is measured using an optical device as depicted in FIG. 1. The polymeric specimen may be a 60×60×2 mm plaque mold formed in accordance with ISO 294-3 type D2 mold from polymeric compositions of this disclosure. Referring to FIG. 1, an optical measurement of the specimen length is performed by placing a polymeric specimen on the positioning table 220 and setting the positioning table 220 under a microscope camera 210 that is in communication with a microprocessor 200. The optical device is stabilized by a solid machined steel plate 240 and associated spacers 230. The position of both edges of a polymeric specimen is recorded at the start and end of a period of time with the help of a specific mark on a display screen of the microprocessor 200. The specimen length or width is subsequently deduced from the change in position observed over the period of time. The processing parameters for shrinkage measurements are based on ISO 294-3 and ISO 294-1 with two noticeable differences: (1) the holding pressure can be chosen on the same material from 20 MPa, 40 MPa, 60 MPa or 80 MPa and (2) the holding time is kept to a minimum.

Polymeric compositions of this disclosure may be formed into end-use articles by a variety of plastics shaping processes. Plastic shaping processes are known to one skilled in the art. In an embodiment, the plastics shaping process is injection molding.

Figure 2:
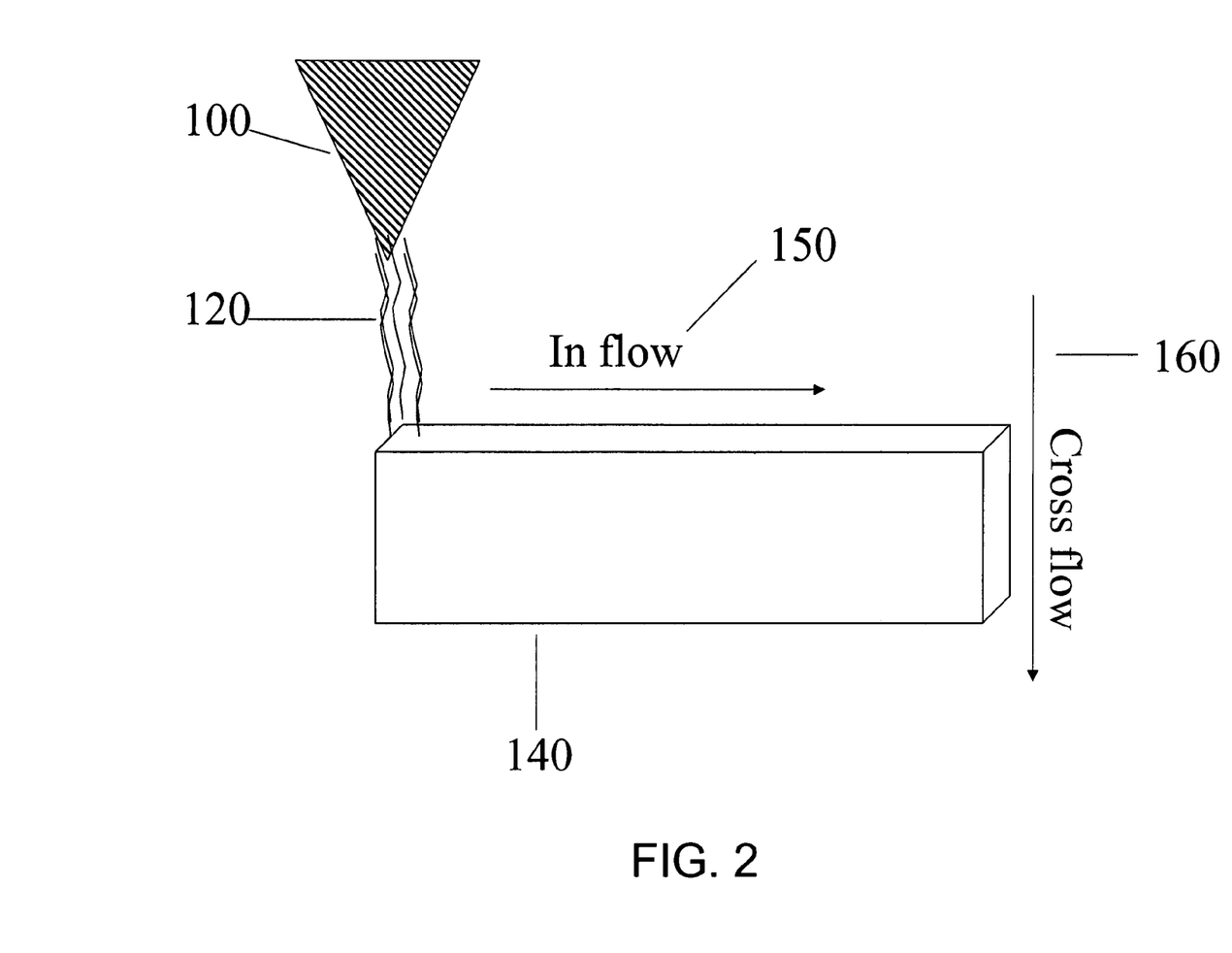
FIG. 2 is an illustration of a plastics shaping process.

In injection molding, a polymeric resin is fed to an injection molder through a hopper. Referring to FIG. 2, resins enter the injection barrel 100 by gravity through a feed throat (not depicted) where they are heated to the appropriate melt temperature. The molten resin 120 is then injected into the mold cavity 140 where it is shaped into the desired part. The mold is cooled constantly to a temperature that allows the resin to solidify and be cool to the touch. The molten resin while filling the cavity flows in the direction of the injection which is termed in flow 150 and also spreads out perpendicular to the injection flow in a direction termed the cross flow 160.

In an embodiment, the polymeric compositions may be used to form end-use articles with a part weight of less than about 65 grams, alternatively from about 52 grams to about 62 grams, alternatively from about 60 grams to about 62 grams, alternatively from about 52 grams to about 55 grams. These articles may be formed using a suitable injection molder operating at a cycle time of equal to or less than about 7.0 seconds, alternatively equal to or less than about 6.5 seconds, alternatively equal to or less than about 6.0 seconds, alternatively from about 6.0 seconds to about 7.0 seconds. For example, for a high speed thin wall injection molder utilizing high cavitation stacked molds (e.g., having 16 cavities or greater) cycle times may be equal to or less than about 7.0 s.

The polymeric compositions of this disclosure may be converted to a preform or end-use article by any suitable method. In an embodiment, this conversion is a plastics shaping process such as those described in this disclosure. Examples of end use articles into which the polymeric composition may be formed include pipes, films, bottles, fibers, containers, cups, lids, plates, trays, car parts, blister packs, and so forth. Additional end use articles would be apparent to those skilled in the art.

In an embodiment, an end-use article of this disclosure is a packaging container for a consumer product such as a media-packaging container (e.g., CD case, DVD case, VHS case, etc.). Alternatively, the end-use article is a food container. Additional end use articles would be apparent to those skilled in the art. In an embodiment, the polymeric compositions of this disclosure are used to form thin wall packaging containers. In some embodiments, the thin wall packaging container is used for food packaging and has a wall thickness of less than about 25 mils. Additionally, the food-packaging container may have a length to thickness ratio of equal to or greater than about 250, alternatively equal to or greater than about 300, where the length refers to the flow length of the resin and the width refers to the thickness of the part.

In some embodiments, the thin wall packaging container is used for media packaging and has a wall thickness of equal to or less than about 1.2 mm, alternatively equal to or less than about 1.1 mm, alternatively about 1.05 mm. Thinwall media packaging of this disclosure may have reduced warpage as indicated by a decrease in "corner smile." In an embodiment, the media packaging has no discernable corner smile upon visual inspection.

Figure 3:
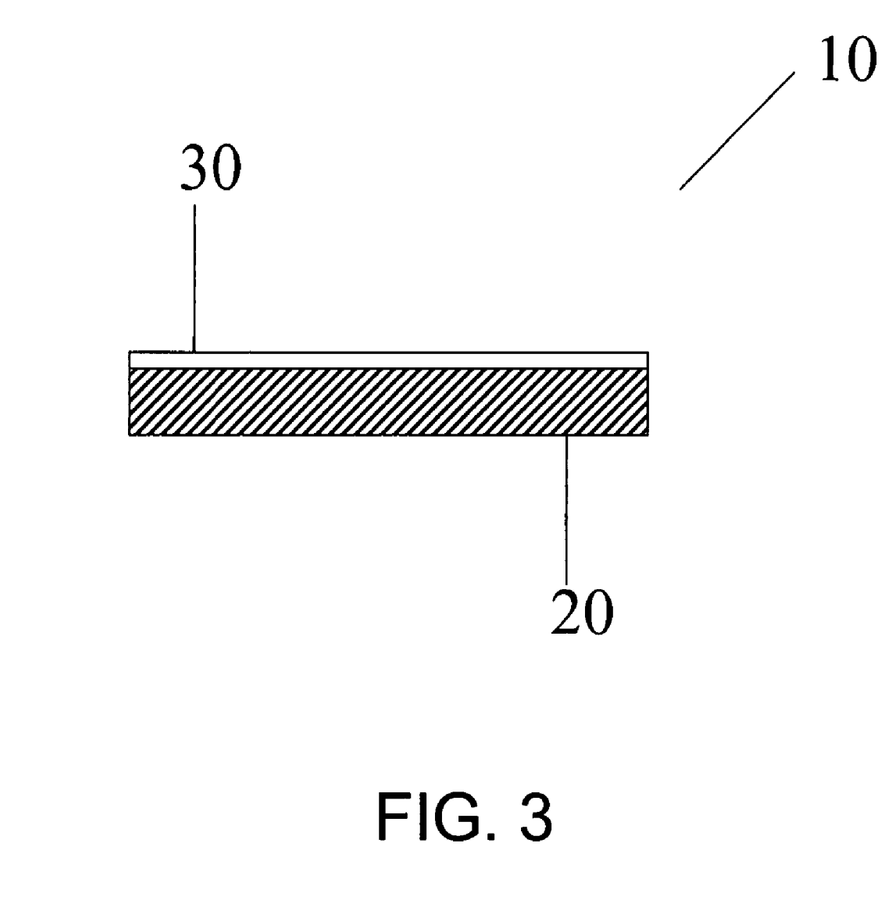
FIG. 3 is an illustration of a container.
Figure 4A:
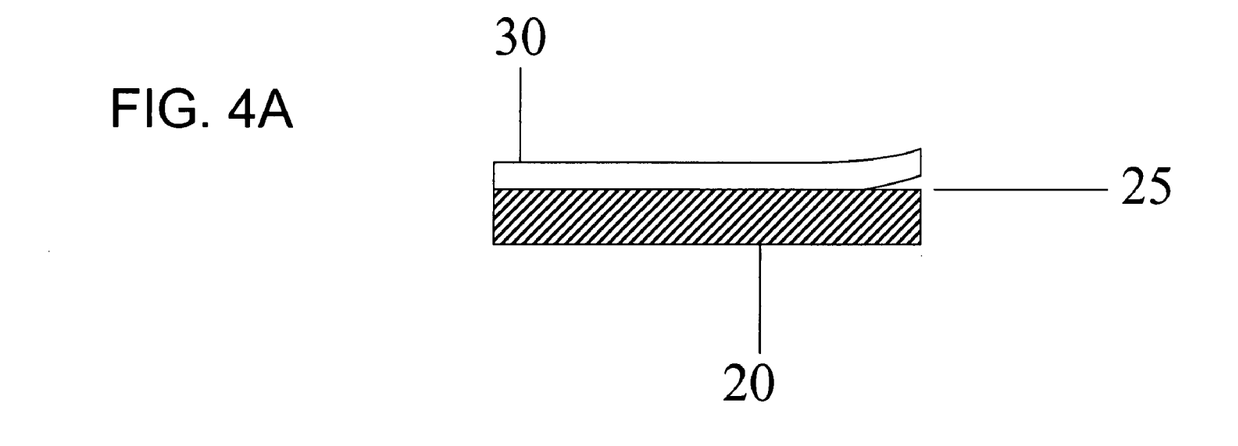
FIG. 4A is an illustration of container warpage.
Figure 4B:
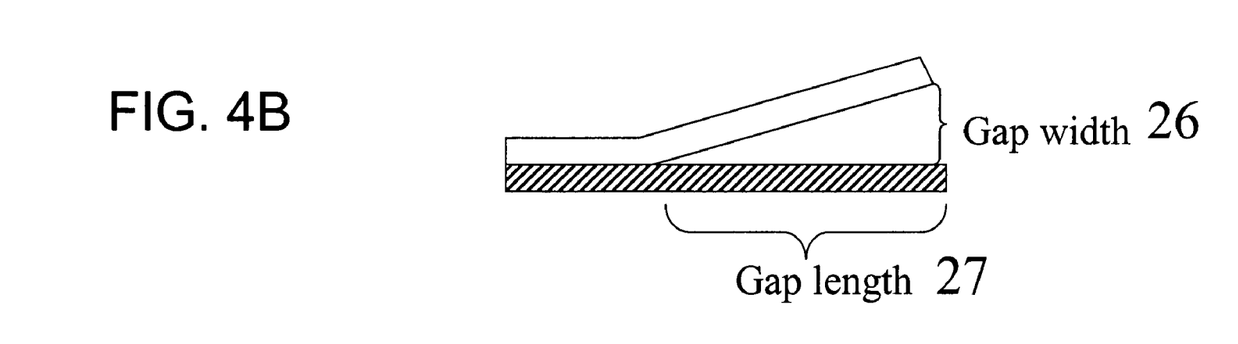
FIG. 4B is an exploded view of container warpage.

Referring to FIG. 3, a thin wall media container 10 is depicted having a lid 30 and a base 20. In the absence of warpage the lid 30 and base 20 have no discernible break in contact when the packaging container is closed. However, warpage of the container due to shrinkage may result in a corner smile 25 or a gap as depicted in FIG. 4A where there is a break in contact between the end of the lid 30 and the base 20. Referring now to FIG. 4B, the extent of the corner smile may be determined by evaluating the width of the gap 26 between the lid and base and the length of the gap 27 between the lid and base. Alternatively, the gap may be evaluated by measuring the gap width using a feeler gauge having a thickness of 0.5 mm. In an embodiment, end-use articles of this disclosure have a reduced corner smile as measured by gap width of equal to or less than about 0.5 mm, alternatively equal to or less than about 0.4 mm, alternatively equal to or less than about 0.3 mm and a gap length of less than about 0.5 inches.

EXAMPLES

The invention having been generally described, the following examples are given as particular embodiments of the invention and to demonstrate the practice and advantages thereof. It is to be understood that the examples are given by way of illustration and are not intended to limit the specification of the claims in any manner.

Example 1

The effect of nucleators on the shrinkage of four polypropylene resins was determined. Four $C_2$-$C_3$ copolymer resins were compared; 5720 type, a polypropylene impact copolymer with a MFR of 20; 7600 type, a class of polypropylene random copolymer with an MFR of about 11; 4920WZ, a polypropylene impact copolymer with a MFR of 100; and 5945WZ, a polypropylene impact copolymer with a MFR of 80. These resins have an ethylene content ranging from about 8.0 wt. % to about 12.0 wt. %. The physical properties of each of these resins are given in Table 3.

TABLE 3

|  | 5720[2] | 7600[2] | 4920WZ | 5945WZ |
|---|---|---|---|---|
| Resin Properties[1] | | | | |
| Melt Flow, g/10 min. | 20 | 11 | 105 | 80 |
| Density, g/cc | 0.905 | 0.900 | 0.905 | 0.905 |
| Melting Point/range[3], °C. | 160-165 | 145 | 160-165 | 160-165 |
| Mechanical Properties | | | | |
| Tensile strength at Yield, psi (MPa) | 3200 (22) | 3900 (26.9) | 3700 (25) | 3700 (25) |
| Elongation at Yield, % | 9 | 10 | 6 | 6 |
| Flexural Modulus, psi (MPa) | 170,00 (1200) | 150,000 (1,035) | 190,000 (1300) | 180,000 (1,250) |
| Izod Impact @ 73° F. Notched-ft · lb./in. (J/m) | 3.6 (180) | 1.2 (64.1) | 1.0 (50) | 1.6 (85) |
| Thermal Properties | | | | |
| Heat Deflection, °C. | 87 | 91 | 110 | 110 |

[1]ASTM methods: Melt flow D-1238, density D-1505, Tensile strength at Yield and elongation at Yield D-638, Flexural modulus D-790, Izod impact (notched) D-256, Heat deflection D-648
[2]These values represent values typical for this series of polymeric resins.
[3]Melting points or ranges were determined in accordance with an in-house method, TOTAL Polypropylene method The physical properties for each resin given in Table 3 were determined in accordance with the referenced ASTM methods. Each of these resins was tested for shrinkage in the absence of a nucleator or in the presence of one of the following nucleators: sodium benzoate (NaBz), a phosphate ester (Na-11), a norbornane carboxylic-acid salt (HPN68), or talc.

Shrinkage measurements were performed on a 60×60×2 mm plaque mold using an optical device as depicted in FIG. 1 and as described previously herein. A machined key was used to print 4 lines on the bottom of the mold cavity. The precise surface parallelism on the key allowed engraving lines parallel to the mold edges. These lines were then replicated on the molded part. They provided a good singularity when observed under the microscope and therefore a good precision on the length measurement was obtained.

The standard deviation on the shrinkage measurement was approximated by combining the deviation on four elements: the table deviation, the angular position of the specimen on the positioning table, the error on the mold length measurement, and the error on the specimen length measurement.

Let $\delta_{table}$, $\delta_{mold}$, $\delta_{position}$ and $\delta_{part}$ be half of the tolerance interval of the mold measurement, the position on the table and the part measurement. The final shrinkage result was expressed as in Equation 1.

$$\text{Shrinkage} \pm (\delta_{table} + \delta_{mold} + \delta_{position} + \delta_{part})\% \qquad (1)$$

The positioning table deviation is 0.002 mm/25mm. Equation 2 exhibits the values of $\delta_{tabl}$ $$2 \times \delta_{table} = 0.002 \times 100/25 = 0.008\%. \qquad (2)$$

The specimen was positioned on the table guided by a machined groove on the positioning table. In the event of a small flash, an approximate 0.3 mm offset can occur. In the event of such offset e, the actual specimen length measured is given by Equation 3 and Equation 4.

Finally, the deviation on the measurement is given in Equation 5

$$\alpha = \tan^{-1}\left(\frac{e}{Lref}\right) \qquad (3)$$
$$= \tan^{-1}\left(\frac{0.3}{54.189}\right)$$
$$= 0.317 \text{ degree}$$

$$Lmes = Lref \times \cos(\alpha) \qquad (4)$$
$$= 54.189 \times \cos(0.317)$$
$$= 54.188 \text{ mm}$$

$$\delta_{position} = \frac{Lref - Lmes}{Lref} \times 100 \qquad (5)$$
$$= 0.002\%$$

The standard deviation on the mold length is 0.9166 mm. Therefore, the deviation in % was as expressed in Equation 6.

$$2 \times \delta_{Mold} = \frac{0.0166}{54.189} \times 100 \qquad (6)$$
$$= 0.0153\%$$

A typical standard deviation on the part length is 0.0166 mm. Therefore, the deviation in % was as expressed in Equation 7.

$$2 \times \delta_{part} = \frac{0.00757}{53.369} \times 100 \qquad (7)$$
$$= 0.0142\%$$

An estimated tolerance interval $\delta$ on the shrinkage measurement is given in Equation 8.

$$\delta = \pm 0.0208\% \qquad (8)$$

Table 4 presents the measured in-flow and cross flow shrinkage after 1 and 48 hours for the listed resins without nucleator or in the presence of the indicated amount of nucleator. Standard deviation, when calculated, is given in parentheses.

TABLE 4

| | Resin | LOT# | 1 hr shrinkage | | 48 hr shrinkage | |
|---|---|---|---|---|---|---|
| | | | In-flow | Cross-flow | In-flow | Cross-flow |
| 1 | 5720 type | #1-no nucleator | 1.13 | 1.22 | 1.23 | 1.33 |
| 2 | 5720 type | #2-500 ppm NaBz | 1.13 | 1.59 | 1.26 | 1.71 |
| 3 | 5720 type | #3-1000 ppm NaBz | 1.14 | 1.62 | 1.28 | 1.72 |
| 4 | 5720 type | #4-1000 ppm talc | 1.13 | 1.22 | 1.25 | 1.34 |
| 5 | 5720 type | #5-3000 ppm talc | 1.13 | 1.25 | 1.23 | 1.35 |
| 6 | 5720 type | #6-200 ppm HPN68 | 1.24 | 1.57 | 1.34 | 1.69 |
| 7 | 5720 type | #7-500 ppm HPN68 | 1.25 | 1.62 | 1.34 | 1.70 |
| 8 | 5720 type | #8-1000 ppm NA11 | 1.12 | 1.63 | 1.19 | 1.77 |
| 9 | 5720 type | #9-2000 ppm NA11 | 1.16 | 1.66 | 1.22 | 1.64 |
| 10 | 7600 type | #1-no nucleator | 0.79 | 1.10 | 0.98 | 1.22 |
| 11 | 7600 type | #2-500 ppm NaBz | 0.99 | 1.45 | 1.09 | 1.57 |
| 12 | 7600 type | #3-1000 ppm NaBz | 0.99 | 1.50 | 1.11 | 1.61 |
| 13 | 7600 type | #4-1000 ppm talc | 0.90 | 1.02 | 1.00 | 0.90 |
| 14 | 7600 type | #5-3000 ppm talc | 0.86 | 1.04 | 1.02 | 1.03 |
| 15 | 7600 type | #6-200 ppm HPN68 | 0.94 | 1.46 | 0.98 | 1.58 |
| 16 | 7600 type | #7-500 ppm HPN68 | 0.98 | 1.55 | 1.06 | 1.71 |
| 17 | 7600 type | #8-1000 ppm NA11 | 0.99 | 1.57 | 1.06 | 1.64 |
| 18 | 7600 type | #9-2000 ppm NA11 | 1.08 | 1.53 | 1.18 | 1.71 |
| 19 | 4920WZ | 4920WZ with 600 ppm NaBz | 1.28(0.03) | 1.70(0.04) | 1.38(0.02) | 1.77(0.04) |
| 20 | 4920WZ | 4920WZ with 1000 ppm NaBz | 1.29(0.03) | 1.77(0.03) | 1.38(0.04) | 1.81(0.06) |
| 21 | 4920WZ | 4920WZ with 250 ppm HPN68L | 1.69(0.05) | 1.81(0.02) | 1.75(0.05) | 1.97(0.03) |
| 22 | 5945WZ | 80MFR 5945WZ with 3000 ppm talc | 1.24(0.08) | 1.57(0.53) | 1.43(0.04) | 1.42(0.03) |
| 23 | 5945WZ | 80MFR 5945WZ with 500 ppm NaBz | 1.26(0.18) | 1.45(0.21) | 1.29(0.03) | 1.66(0.05) |

The results demonstrate near zero shrinkage after 48 hrs for the 80 MFR 5945WZ nucleated with talc. For example, referring to row 22 of Table 4, 5945WZ has an inflow shrinkage after 48 hours of 1.43±0.04 and a shrinkage in the cross flow of 1.42±0.03. The resultant change is than 1%.

Example 2

The effect of nucleators on the differential shrinkage of TOTAL POLYPROPYLENE 3620WZ, a polypropylene homopolymer resin. The physical properties of TOTAL POLYPROPYLENE 3620WZ are given in Table 5. Data on the extent of differential shrinkage in the longitudinal and transverse directions are presented in Table 6. Experimental conditions, calculations of differential shrinkage and standard deviation (given in parentheses) were carried out as described in Example 1.

TABLE 5

| | 3620WZ |
|---|---|
| Resin Properties[1] | |
| Melt Flow, g/10 min. | 12 |
| Density, g/cc | 0.905 |
| Melting Point/range[2], ° C. | 165 |
| Mechanical Properties | |
| Tensile strength at Yield, psi (MPa) | 5400(37.2) |
| Elongation at Yield, % | 12 |
| Flexural Modulus, psi (MPa) | 230,000 (1,590) |
| Izod Impact @ 73° F. | |
| Notched-ft · lb./in. (J/m) | 0.5 (26.7) |
| Thermal Properties | |
| Heat Deflection, ° C. | 127 |

[1]ASTM methods: Melt flow D-1238, density D-1505, Tensile strength at Yield and elongation at Yield D-638, Flexural modulus D-790, Izod impact (notched) D-256, Heat deflection D-648
[2]Melting points or ranges were determined in accordance with an in-house method, TOTAL Polypropylene method

TABLE 6

| | 1 hr shrinkage | | 48 hr shrinkage | |
|---|---|---|---|---|
| Resin | LGT | TSR | LGT | TSR |
| 3620WZ (no nucleator) | 1.27 (0.02) | 1.47 (0.04) | 1.34 (0.04) | 1.54 (0.02) |
| 3620WZ + 500 ppm NaBz | 1.46 (0.02) | 1.91 (0.05) | 1.57 (0.05) | 1.98 (0.04) |
| 3620WZ + 1000 ppm NaBz | 1.49 (0.02) | 1.88 (0.02) | 1.57 (0.03) | 2.01 (0.01) |
| 3620WZ + 1000 ppm talc | 1.30 (0.02) | 1.35 (0.02) | 1.34 (0.05) | 1.49 (0.02) |
| 3620WZ + 3000 ppm talc | 1.37 (0.02) | 1.48 (0.01) | 1.40 (0.05) | 1.56 (0.04) |
| 3620WZ + 200 ppm HPN68 | 1.55 (0.02) | 1.99 (0.02) | 1.58 (0.05) | 2.14 (0.03) |
| 3620WZ + 500 ppm HPN68 | 1.56 (0.05) | 1.98 (0.01) | 1.59 (0.08) | 2.09 (0.04) |

TABLE 6-continued

| | 1 hr shrinkage | | 48 hr shrinkage | |
|---|---|---|---|---|
| Resin | LGT | TSR | LGT | TSR |
| 3620WZ + 1000 ppm NA11 | 1.56 (0.03) | 2.14 (0.04) | 1.60 (0.07) | 2.24 (0.03) |
| 3620WZ + 2000 ppm NA11 | 1.56 (0.06) | 2.18 (0.03) | 1.61 (0.06) | 2.30 (0.03) |

LGT = longitudinal
TSR = transverse

The results of these experiments indicate that nucleated TOTAL POLYPROPYLENE 3620WZ exhibits a reduced isotropic and differential shrinkage. The near unity of the differential shrinkage, ratio of LGT/TSR near 1, for the TOTAL POLYPROPYLENE 3620WZ nucleated with talc can be translated to a tendency to have reduced warpage in injection-molded parts.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A polymeric composition comprising an impact copolymer and a nucleation agent, and having isotropic shrinkage of less than about 20% and a differential shrinkage of less than about 20%.

2. The composition of claim 1 wherein the impact copolymer comprises a polypropylene homopolymer component and ethylene-propylene rubber component.

3. The composition of claim 2 wherein the polypropylene homopolymer component comprises up to about 5 wt. % of another $C_2$-$C_8$ alphaolefin.

4. The composition of claim 2 wherein the ethylene-propylene rubber component comprises from about 38 wt. % to about 48 wt. % ethylene.

5. The composition of claim 2 wherein the ethylene-propylene rubber component comprises from about 14 wt. % to about 18 wt. % of the impact copolymer.

6. The composition of claim 2 wherein the ethylene-propylene rubber component has an intrinsic viscosity of from about 2.0 dl/g to about 3.0 dl/g.

7. The composition of claim 1 wherein the nucleation agent is an aromatic carboxylic acid salt, a metal benzoate, an organophosphate, a pine rosin, a sorbitol, a norbornane carboxylic acid salt, a talc or combinations thereof.

8. The composition of claim 1 wherein the nucleation agent is talc and is present in an amount of from about 1000 ppm to about 10000 ppm.

9. The composition of claim 2 wherein the impact copolymer has a melt flow rate of from about 65 g/10 min. to about 130 g/10 min.

10. The composition of claim 1 having an Izod impact of from about 0.7 ft lb/in to about 1.6 ft lb/in.

11. The composition of claim 1 having a flexural modulus of from about 160,000 psi to about 220,000 psi.

12. The composition of claim 1 further comprising from about 500 ppm to about 5000 ppm of a metallic sterate.

13. The composition of claim 1 further comprising from about 500 ppm to about 5000 ppm of a glycerol ester.

14. An article comprised of the polymeric composition of claim 1.

15. The article of claim 14 is a thin wall packaging container.

16. The article of claim 14 is a food container having a wall thickness of equal to or less than about 25 mils and a length to thickness ratio of equal to or greater than about 250.

17. The article of claim 14 weighing less than about 65 grams.

18. The article of claim 15 is a media container having a wall thickness of equal to or less than about 1.2 mm.

19. The article of claim 18 having no discernable corner smile upon visual inspection.

20. The article of claim 18 having a corner gap width of equal to or less than about 5 mm.

21. A process for making the article of claim 15, comprising injection molding the polymeric composition into the article at a cycle time of equal to or less than about 7 seconds.

* * * * *